Dec. 19, 1933.  P. N. BOSSART  1,940,114
ELECTRICAL DISTANCE MEASURING APPARATUS AND METHOD
Filed April 9, 1930
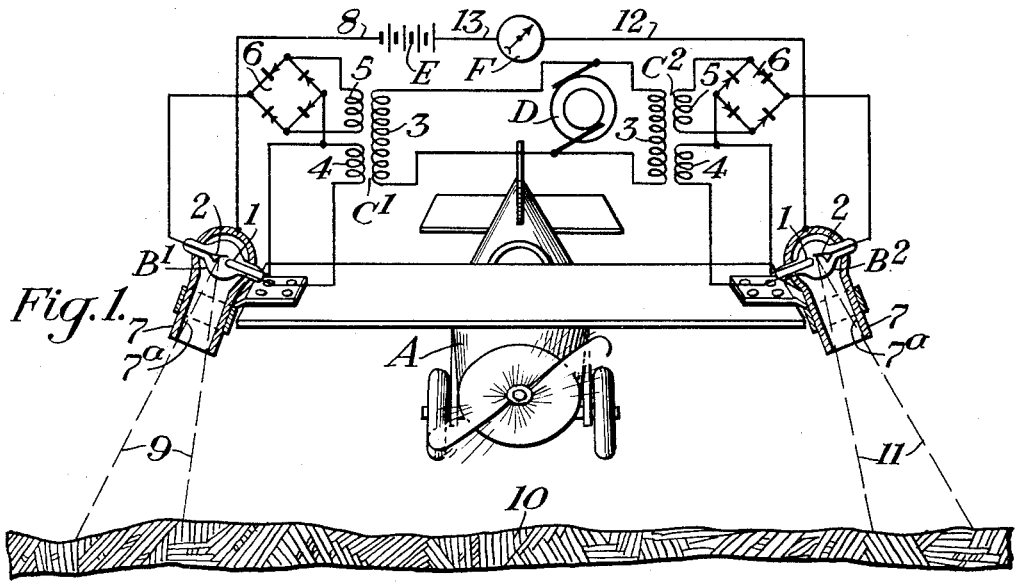
Fig. 1.
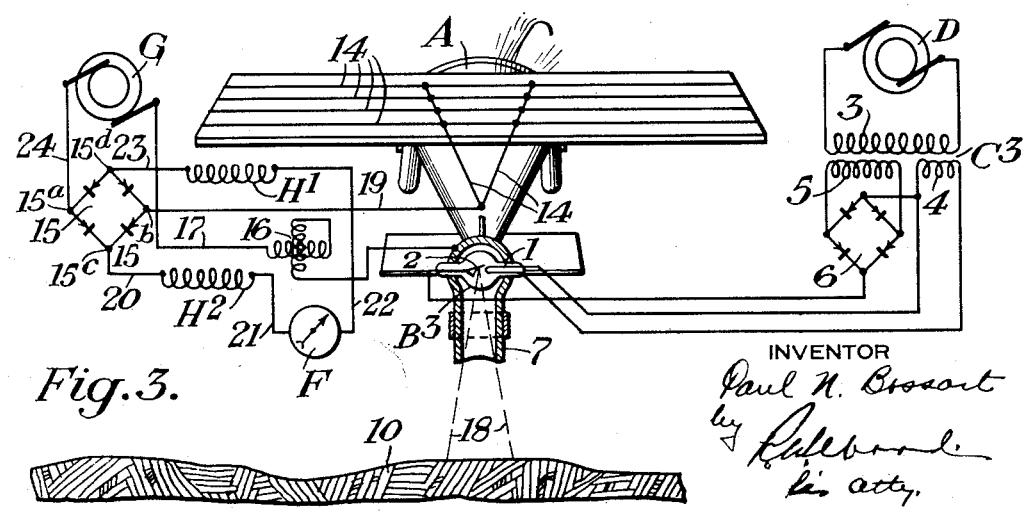
Fig. 2.
Fig. 3.
INVENTOR
Paul N. Bossart
by [signature]
his atty.

Patented Dec. 19, 1933

1,940,114

UNITED STATES PATENT OFFICE 1,940,114

ELECTRICAL DISTANCE MEASURING APPARATUS AND METHOD

Paul N. Bossart, Swissvale, Pa., assignor to The Union Switch & Signal Company, Swissvale, Pa., a corporation of Pennsylvania Application April 9, 1930. Serial No. 442,990

2 Claims. (Cl. 250—1)

My invention relates to the electrical distance measuring apparatus, and methods of employing the same and particularly to apparatus and methods for measuring, on an aircraft, the height of the aircraft above ground.

I will describe three forms of apparatus embodying my invention and methods of employing the same, and will then point out the novel features thereof in claims.

In the accompanying drawing, Fig. 1 is a view, partly in perspective, partly in section, and partly diagrammatic, showing one form of apparatus embodying my invention. Figs. 2 and 3 are similar views showing modified forms of the apparatus illustrated in Fig. 1.

Similar reference characters refer to similar parts in all three views.

Referring first to Fig. 1, the reference character A designates an aircraft which is here illustrated for convenience as an airplane, but which may be any form of craft designed for the navigation of the air. Secured to the plane A at suitable points, preferably as far apart as possible, such for example, as at the extreme ends of the wings, are two devices $B^1$ and $B^2$ which are capable of ionizing, or rendering conducting, a path through the medium between the plane and the ground. As here shown, each device B comprises a tube for producing X-rays, such for example, as a Coolidge tube of the well-known form having a metal target 2 and a filament 1 which, when heated to incandescence, will emit electrons. The tubes $B^1$ and $B^2$ are arranged to be energized by means of two transformers $C^1$ and $C^2$, respectively, each consisting of a primary 3 which is constantly supplied with alternating current from a suitable source, such as an alternator D, and two secondaries 4 and 5. The secondary 4 of each transformer is constantly connected directly with the filament 1 of the associated tube, and the secondary 5 of each transformer is constantly connected between the filament 1 and the target 2 of the associated tube through a suitable form of rectifying device, here shown as a full-wave copper oxide rectifier 6 of the well-known form. It will be apparent, therefore, that the tubes $B^1$ and $B^2$ constantly emit X-ray pulses. When only a small amount of power is applied to the tubes, the rectifiers 6 may be omitted since tubes of the type described are self-rectifying as long as the target 2 is kept cool.

Each tube B is enclosed in a heavy metal shield or collimator 7 provided with an opening $7^a$ which permits only a narrow beam of the X-ray pulses emitted by the tubes to emerge from the collimator, these beams being directed toward the ground preferably at a small distance ahead of the plane. It is important that these beams do not touch each other, but it is desirable that the beams diverge considerably in order to insure good contact between the beams and the ground. Connected in series between the collimators 7 is a source of current either direct or alternating, here shown as a battery E, and a suitable form of indicator F which may be any sensitive current detector.

It is well-known that air when ionized by X-rays becomes a relatively good conductor. It will be apparent, therefore, from an inspection of Fig. 1 that the beams which issue from the collimators 7, and which I will designate 9 and 11, respectively, are included in an electric circuit over which current flows from battery E through wire 8, collimator 7 associated with tube $B^1$, beam 9, the ground 10 between the beams 9 and 11, beam 11, collimator 7 associated with tube $B^2$, wire 12, indicator F, and wire 13 back to battery E. The impedances of beams 9 and 11 to current from battery E vary in accordance with the lengths of these beams, and hence with the height of the airplane A above ground. Since the impedances of beams 9 and 11 constitute the major portion of the total impedance of the circuit for indicator F, traced above, it is apparent that any change in these impedances will vary the current flowing through the indicator F. It follows that by properly calibrating the indicator, it may be made to read directly the height of the airplane A above the ground.

Referring now to Fig. 2, in the modified form of apparatus here shown, the plane A is provided with only one X-ray tube which I have designated $B^3$. This tube is supplied with current from a transformer $C^3$ in the same manner as the tubes $B^1$ and $B^2$ described in connection with Fig. 1 are supplied with current from the transformers $C^1$ and $C^2$, and is enclosed in a collimator 7 which permits only a narrow beam 18 of the X-ray pulses emitted by the tube to emerge from the collimator, this beam being directed toward the ground. The tube $B^3$ is preferably located at the extreme end of the fuselage of the plane and is arranged in such manner that the tube and collimator are both insulated from any metal parts of the plane. A source of high frequency alternating current, here shown as an alternator G, has one terminal connected with the collimator 7 and the other terminal connected with the input terminal $15^a$ of a full-wave rectifier 15. The remaining input terminal $15^b$ of the rectifier 15 is connected with the metal framework of the plane, if the plane has a metal framework, or, if the plane does not have a metal framework, then with a suitable electrical conductor, such as a network 14 of wires carried by the plane. This network serves as one plate of a condenser, the other plate of which is ground, and the intervening dielectric of which is the air between the network 14 and the ground. The output terminals $15^c$ and $15^d$ of rectifier 15 are connected with the indicator F through two high frequency chokes $H^1$ and $H^2$ which serve to keep the high frequency alternating current from generator G out of the indicator F. The parts are so proportioned that at the maximum height for which the apparatus is designed to function, the capacity between the network 14 and the beam 18 will not completely mask the capacity between the network 14 and the ground 10.

With the apparatus constructed in this manner, it will be seen that an electric circuit is completed including the beam 18 and the condenser formed by the network 14 and the ground 10, and during alternate half-cycles of one polarity current flows in this circuit from alternator G through wire 17, collimator 7, beam 18, ground 10, the condenser formed by the network 14 and the ground 10, wire 19, the leg of rectifier 15 between terminals $15^b$ and $15^c$, wire 20, choke $H^2$, wire 21, indicator F, wire 22, choke $H^1$, wire 23, the leg of rectifier 15 between terminals $15^d$ and $15^a$, and wire 24 back to alternator G. During alternate half-cycles of the opposite polarity, current flows in this circuit from alternator G through wire 24, the leg of rectifier 15 between terminals $15^a$ and $15^c$, wire 20, choke $H^2$, wire 21, indicator F, wire 22, choke $H^1$, wire 23, the leg of rectifier 15 between terminals $15^d$ and $15^b$, wire 19, the condenser formed by the network 14 and ground 10, ground 10, beam 18, collimator 7, and wire 17 back to alternator G. The magnitude of the current which flows in this circuit and, hence, the reading of the indicator F depends upon the total impedance of the circuit, and the major portion of this impedance is the resistance of the beam 18 and the capacity between the network 14 and the ground 10. Both the resistance of the beam 18 and the capacity between the network 14 and the ground 10 vary as the height of the plane above ground varies, and it follows, that by properly calibrating the indicator F, the indicator F may be made to read directly the height of the plane above ground.

Referring now to Fig. 3, the apparatus here shown is similar to the apparatus shown in Fig. 2, except that a suitable tuning device, such as a variometer 16, is inserted between the alternator G and the collimator 7 for tube $B^3$. If this variometer is adjusted until indicator F gives a maximum reading, that is to say, until the circuit including the variometer 16 is in resonance, at the frequency of the current supplied by alternator G, then the reading of the variometer is a measure of the capacity between the network 14 and the ground 10, and, since this capacity is a function of the height of the plane above ground, it will be clear that the variometer may be calibrated to read directly the height of the plane above ground. One advantage of this latter method of measuring height is that the measurement is independent of the resistance of the ionized beam 18.

It will be noted that in both Figs. 2 and 3, the indicator F is operated by direct current which is supplied to the indicator through a rectifier. This arrangement is utilized because direct current indicators are usually more sensitive than alternating current indicators, but it is to be understood that an indicator which operates on alternating current may be substituted for the rectifier 15 and the indicator F if desired.

It should be pointed out that while I have illustrated my invention as being particularly suitable for use in measuring the height of an aircraft above ground, it is equally susceptible for use in determining the height of any object above ground, or the distance between any two objects which are separated from each other by a medium which can be ionized by X-rays or other similar forms of radiant energy.

Although I have herein shown and described only three forms of electrical distance measuring apparatus embodying my invention and methods of employing the same, it is understood that various changes and modifications may be made therein within the scope of the appended claims without departing from the spirit and scope of my invention.

Having thus described my invention, what I claim is:

1. The combination with an aircraft provided with metal members forming one plate of a condenser the other plate of which is ground, of a source of X-rays on the aircraft, a collimator associated with said source and provided with an opening which permits only a narrow beam of rays to issue from said source, said beam being directed toward the ground, a source of alternating current of constant frequency on the aircraft connected between said metal members and said collimator, whereby an electric circuit including said source, said beam, ground, and said condenser is completed; means associated with said circuit for tuning said circuit to resonance at the frequency of the current from said source, said means being calibrated in such manner that when said circuit is in resonance said means will read directly the height of said aircraft above ground.

2. The method of measuring the distance between two insulated conducting objects which consists in ionizing the insulating medium between said objects to produce a conducting beam, and measuring the capacity between the two objects by tuning to resonance a circuit including said beam, the condenser formed by said objects, and a source of alternating electromotive force.

PAUL N. BOSSART.